United States Patent
Allen et al.

(10) Patent No.: US 6,237,048 B1
(45) Date of Patent: May 22, 2001

(54) ADAPTER CARD WITH VENDOR UNIQUE DIFFERENTIATION AND CUSTOMIZATION USING PCI SIDEBAND SIGNALS

(75) Inventors: Jonathan Michael Allen; Daniel Frank Moertl, both of Rochester, MN (US); Danny Marvin Neal, Round Rock, TX (US); Gregory Michael Nordstrom, Oronoco; Thomas James Osten, Rochester, both of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/149,043

(22) Filed: Sep. 8, 1998

(51) Int. Cl.[7] .............................. G06F 3/00; G06F 13/12; G06F 13/38
(52) U.S. Cl. .................................... 710/8; 710/8; 710/62; 710/72
(58) Field of Search ................... 710/8, 28, 62, 710/63, 72, 10, 104, 129, 131

(56) References Cited

U.S. PATENT DOCUMENTS

| | | | |
|---|---|---|---|
| 4,787,064 | * 11/1988 | Wagner | 713/600 |
| 5,371,892 | * 12/1994 | Petersen et al. | 713/1 |
| 5,594,874 | * 1/1997 | Narayanan et al. | 710/104 |
| 5,793,987 | * 8/1998 | Quackenbush et al. | 710/100 |
| 5,909,596 | * 6/1999 | Mizuta | 710/63 |
| 5,968,144 | * 10/1999 | Walker et al. | 710/28 |
| 6,026,469 | * 2/2000 | Hoang et al. | 711/118 |

OTHER PUBLICATIONS

Compact PCI Short From Specification, Revision 2.1. PCI Industrial Computers Manufacturers Group (PCIMG) 2.0 R2.1 Sep. 2, 1997. pp. 1–7.
Compact PCI A New Industrial Computer Standards, Downloaded http://www.compactpci.com/.Jul. 10, 1998.
CompactPCI. Downloaded from http://www.picmg.org/acompactpci.htm.Jul. 10, 1998. pp. 1–4.

* cited by examiner

*Primary Examiner*—Thomas Lee
*Assistant Examiner*—Chun Cao
(74) *Attorney, Agent, or Firm*—Christopher H. Lynt

(57) ABSTRACT

In an electrical interface providing a predefined number of connections at least some of which have predefined functions and at least some of which have reserved, undefined or non-critical functions, selective use of at least one of the connections having a reserved, undefined or non-critical function is accomplished. At least one switch is provided which is controllable and coupled to switch at least one connection having a reserved, undefined or non-critical function to a desired customized function. In this way, the electrical interface can be selectively switched to provide additional functionality using reserved, undefined or non-critical connections of the interface.

54 Claims, 6 Drawing Sheets

SmartSwitch Architecture

ADAPTER CARD WITH VENDOR UNIQUE DIFFERENTIATION AND CUSTOMIZATION USING PCI SIDEBAND SIGNALS

BACKGROUND OF THE INVENTION

1. Field of the Invention

The invention relates to the field of adapter cards, and in particular, to use of vendor unique connections in a standard adapter card bus specification.

2. Background Information

In many computer systems, input/output (I/O) interfacing and other special purpose circuitry is often provided using add-on adapter cards which conveniently and simply plug-in to standard bus connectors on a processor mother-board or backplane. A variety of adapter/connector/bus types and standards are known, and one of these is the peripheral component interconnect (PCI) standard.

Standardization provides inherent advantages both for consumers and manufacturers, but also has inherent limitations. A clear advantage of PCI standardization is predictable interchangeability, which gives consumers a wide selection of adapter cards and manufacturers to choose from, and gives manufacturers a large pool of consumers to target. However, as can be readily appreciated, PCI standardization may have the effect of limiting PCI adapter card functionality because of the constraints imposed on the type and number of signals available through the PCI connector. Vendors/manufacturers of PCI adapter cards, motherboards/backplanes and systems (boxes), have an inherent need to differentiate their PCI platforms from the crowd of competitors to gain a marketing advantage over their competitors by providing enhanced functionality. Therefore, a clear disadvantage of PCI standardization is the constraint it places on the ability to customize circuitry to provide enhanced functionality.

In particular, since the current PCI standard does not allow for "vendor unique" connections from PCI adapter cards to PCI motherboards/backplanes through the PCI standard edge connector, customization is limited to what can be accommodated by the standard edge connector. However, the PCI bus standard currently has a number of reserved (RSVD) pins on the edge connector, reserved for future definition and standardization. Presently, there are nine PCI RSVD pins: A09, A11, B10, B14, B63, B92, B93, A92 and A94. There are also some pins which may be infrequently used, such as A14 and A19, for example.

A number of PCI card and backplane vendors, including International Business Machines Corporation, have already made use of some of the reserved pins on the PCI bus connector for proprietary purposes to overcome the customization limitation.

However, as the PCI community continues to define standard uses of these RSVD pins, these legacy cards and backplanes, that is, cards and backplanes on which some RSVD pins are used for proprietary purposes, may experience compatibility problems with systems designed according to a redefined PCI standard. Such problems, of course, negate any marketing advantages that these legacy devices had when they were compatible with the PCI standard.

Currently, the problem of a lack of vendor unique connections in the PCI standard is being addressed by a PCI industrial standards group called PCI Industrial Computer Manufacturers Group (PICMG) which is advancing a new standard called CompactPCI. This new standard is an adaptation of the desktop PCI specification. Among other things, CompactPCI allows a large number of vendor unique connections to a backplane.

However, the CompactPCI solution to the problem of providing vendor unique connections has some drawbacks and limitations. In particular, because CompactPCI is not an ANSI (American National Standards Institute) approved PCI standard, and mainly targets a particular segment of the total PCI market, the advantage of volume acceptance of this solution is currently limited. Further, CompactPCI uses a completely different connector configuration from the current PCI standard connector which raises forward and backward compatibility issues (for the CompactPCI specification, see the PCI Industrial Computer Manufacturers Group website at www.picmg.orglacompactpci.htm).

Therefore, a need exists for a way to accommodate vendor unique differentiation/customization while maintaining the required degree of compatibility and standardization.

SUMMARY OF THE INVENTION

It is, therefore, a principal object of this invention to provide a method and apparatus for vendor unique differentiation.

It is another object of the invention to provide a method and apparatus that solves the above mentioned problems so that standardization and customization can co-exist.

These and other objects of the present invention are accomplished by the method and apparatus disclosed herein.

According to an aspect of the invention, vendor unique differentiation is accomplished using PCI sideband signals, that is, reserved pins and/or other non-critical PCI signal pins, or ground pins, for example.

According to an aspect of the invention, programmable switches, so-called "intelligent switches," also referred to herein as "SmartSwitches," are disposed on either a card or a backplane.

According to another aspect of the invention, a SmartSwitch has an input controlled by the Operating System (OS). The path of control for the OS can be through the PCI bus to a PCI Bridge chip, or directly from a system service processor or an Operator Panel (OpPanel) using a serial bus, for instance. Redundant paths may be provided and used selectively. After initialization, the SmartSwitch is directed to throw-the-switch to connect to one of a plurality of board functions.

According to another aspect of the invention, one or more jumpers on the card allow particular functions to be disconnected and/or select which of the pins have a non-standard function.

According to another embodiment of the invention, instead of placing the SmartSwitch on a backplane, the SmartSwitch is placed on the adapter card itself.

According to another aspect of the invention, in the case where the SmartSwitch is provided on the adapter card, the card includes circuitry for driving the SmartSwitch function through the PCI bus.

According to another aspect of the invention, driving the SmartSwitch through the PCI bus can be accomplished by putting a PCI Bridge chip on the card, or by adding other card logic to respond to a specific PCI configuration cycle or Write command.

According an aspect of the invention, the standard PCI PRSNT (present detect) pin can be wired as an input to either SmartSwitch embodiment mentioned above, for the case where the state of the switch should change based on whether the PCI card is plugged-in.

The solution according to the present invention would be advantageous for any computer manufacturer because of the ability to differentiate their products from each other, while at the same time not sacrificing their "sweet-spot" volume base using standard PCI cards. Adopting an architecture according to the present invention provides an alternative to current and proposed PCI platforms, such as COMPACT PCI.

The solution according to the present invention can be implemented using SmartSwitches on backplanes connected to PCI Bridge chips or serial bus interfaces, and the like. Jumpers for enabling/disabling/selecting the signal lines used for special functions can be provided on the PCI card itself.

Alternatively, the solution according to the invention can be implemented by placing the SmartSwitches on the PCI cards themselves. Further, SmartSwitches could be provided both on the backplane and the PCI card, the SmartSwitch on the card serving the function of the jumpers for enabling/disabling/selecting the signal lines used for special functions.

These and other aspects of the invention will become apparent from the detailed description set forth below.

DETAILED DESCRIPTION OF THE PREFERRED EMBODIMENTS

The invention will now be described in more detail by way of example with reference to the embodiments shown in the accompanying figures. It should be kept in mind that the following described embodiments are only presented by way of example and should not be construed as limiting the inventive concept to any particular physical configuration.

Figure 1:
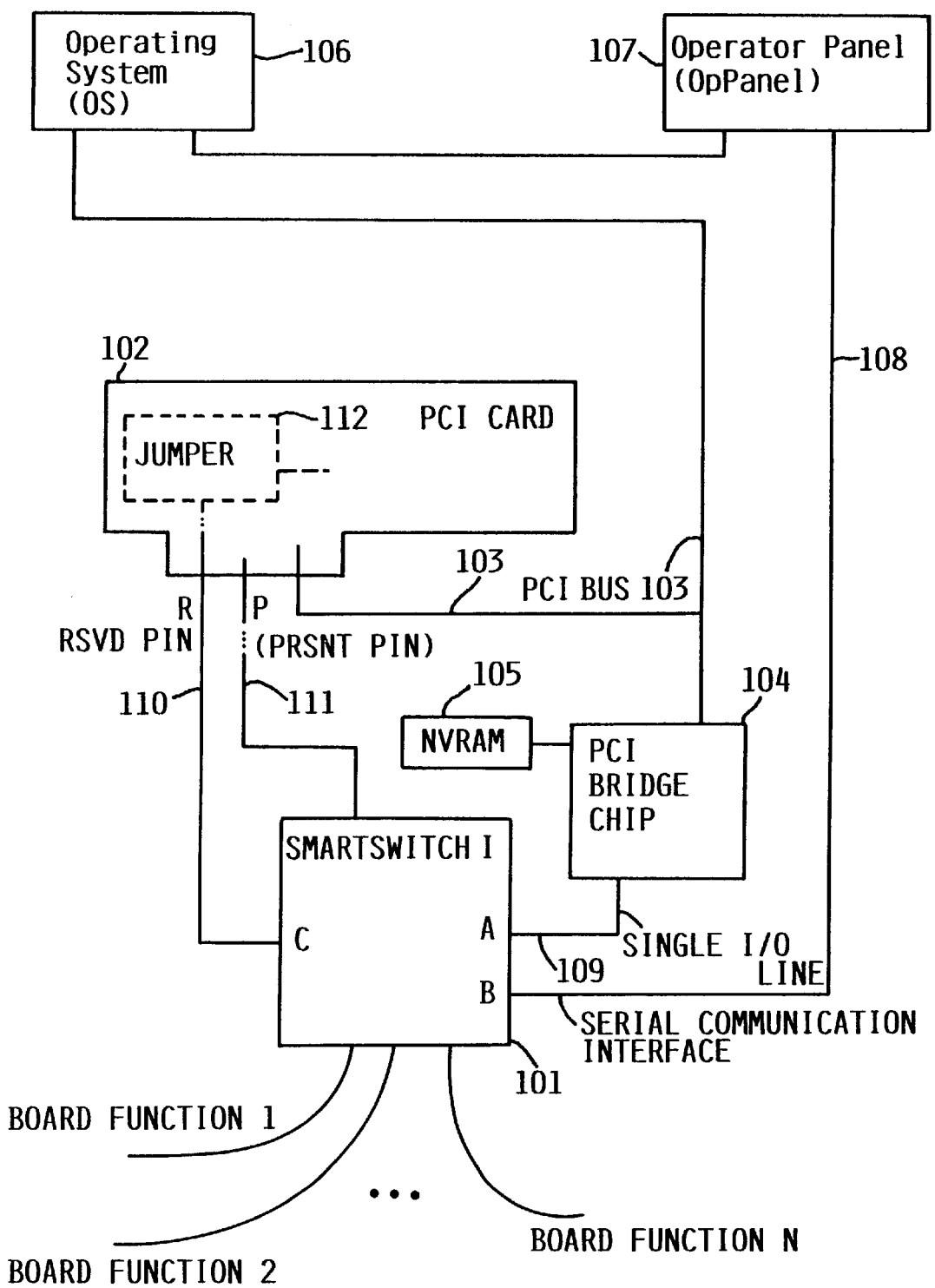
FIG. 1 illustrates a SmartSwitch architecture according to an exemplary embodiment of the present invention.

FIG. 1 is referred to for the following description of a first embodiment of the invention, sometimes referred to herein as the SmartSwitch I embodiment. FIG. 1 shows how a single PCI RSVD pin is switched for the sake of simplification of explanation. However, multiple pins on the same backplane connector can be switched in the same manner by duplicating the illustrated structure, as would be apparent to one skilled in the art.

In the first illustrated exemplary embodiment of the invention, a switch 101, referred to as SmartSwitch I herein, is disposed separate from a peripheral adapter card 102, e.g., on a backplane or motherboard (not shown) having at least one bus interface to which the peripheral adapter card 102 can be coupled, e.g., plugged-into a bus slot connector. In the illustrated embodiment, the bus is a PCI Bus 103 and the adapter card 102 is a PCI card. As part of the illustrated PCI Bus implementation, a PCI Bridge Chip 104 is provided having a non-volatile random access memory (NVRAM) 105 associated therewith. The NVRAM 105 is used to store vital product data (VPD), e.g., configuration information about the backplane/motherboard, and the components coupled to its interface connectors, for example. Information about the operating system and the enclosure may also be stored as VPD in this NVRAM 105, or at other locations in the system. The operating system 106 at initialization, for example, reads the VPD from the NVRAM and elsewhere, and based on what operating system, enclosure, motherboard, and card combination is detected, determines whether to enable the SmartSwitch for a normal board function or one of the customized "fancy" board functions. Such stored VPD information could be in the form of a look-up table that the operating system reads based on the particular card detected. As would be apparent to one skilled in the art, this determination could be accomplished in any number of other ways, and the invention is not considered to be limited the particular way described by way of example.

Ultimately, the PCI Bus 103 is controlled by the computer operating system 106 (OS) as represented. The PCI Bus 103 connects the PCI Card 102 to the rest of the computer system. As illustrated, the computer system may have an Operator Panel 107 (OpPanel) associated therewith. This OpPanel; 107 communicates with the SmartSwitch I 101 through a connection 108, e.g., a serial communication interface, for example, through which the OS 106 exercises control of the SmartSwitch I 101. A so-called service processor (not shown) could also be the vehicle through which the system controls the SmartSwitch I 101. Alternatively, the OS 106 could control the SmartSwitch I 101 through the PCI Bridge Chip 104 as shown by the I/O line 109. This I/O line 109 could be a single (one bit) control line having two binary states (or three states if tri-state logic is used) controlling the SmartSwitch I 101 to be ON or OFF. Alternatively, it could be a serial communication line providing a series of bits which could be placed in a register, for example, and used to provide more complex control, such as selecting which of a plurality of possible functions to switch.

In this regard, SmartSwitch I 101 is shown with inputs A and B, through one of which the Smart Switch I 101 would be controlled by the Operating System 106 (OS) directly or indirectly. In other words, the path of control of the Smart-Switch I 101 by the OS 106 as illustrated can be indirect through the PCI Bus 103 to a PCI Bridge Chip 104 to input A, or direct from an Operator Panel 107 (OpPanel) using the communication line 108, e.g., an 12C serial bus, for instance, to input B.

The SmartSwitch I 101 can be coupled to the PCI Card through reserved, undefined or non-critical pins on the PCI Bus interface, e.g., as illustrated, through a reserved pin 110 (RSVD pin R). The SmartSwitch I 101 may also be connected to the PCI present pin 111 (PRSNT pin P), for reasons which will be described later. Since there are a number of ground pins provided on the PCI bus connectors, one or more of these extra ground pins could be considered as being "non-critical" and used for a SmartSwitch connection. Pins that are non-critical may also include pins that, even though they are defined, are infrequently used, such as A14 and A19, for example. Pin A14 is designated for 3.3VAUX to carry standby power to a portion of the card logic and pin A19 is designated as PME# (Power Management Enable). However, in a given situation, these particular functions may not be used by the system making these pins free to be switched for other uses. Which pin or pins are used for the customized board function or functions, i.e., which pin or pins are subject to switching with the SmartSwitch I 101, can be selected by permanent wiring on the card 102, or by way of selection means, such as the illustrated jumper 112.

The PCI Card 102 is always powered up with the Smart-Switch I 101 open-circuiting the RSVD pin 110. After the OS 106 has determined its system type, it then reads the PCI Card type and the PCI Backplane type, e.g., from card vital product data (VPD) and backplane VPD in the non-volatile random access memory 105 (NVRAM), the SmartSwitch I 101 may be controlled to "throw-the-switch," i.e., to connect the appropriate Board Function 1–N to the PCI Card 102. As alluded to earlier, there may be different types of enclosures and/or different versions or implementations of the operating system itself which have an effect on the decision of whether to enable a special customized board function and/or which function to enable. Therefore, the enclosure and/or operating system VPD may also enter into the determination along with the card and motherboard VPD.

In this way, any card can be plugged into any PCI Backplane connector without fear of damage due to incompatibility, to either the card or the backplane, and the reserved pin can be shared between a vendor unique board function and a function intended by the PCI SIG (special interest group), for example. As mentioned earlier, a selection means, e.g., jumper 112, may be provided for selecting and/or disconnecting the special use of one or more pins of the connector, and some reasons for having this ability will now be explained.

Card vendors providing these special uses of the RSVD and/or non-critical pins for their special function, may find it advantageous to provide the selection means, e.g., jumper 112, on the card to allow that special function to be disconnected and/or assigned to a different pin. This may be advantageous if the card is to be sold in the original equipment manufacturer (OEM) marketplace, where a vendor's backplanes and operating system might not have a SmartSwitch capability, or might have their own vendor unique uses of the RSVD and/or other pins. One vendor's backplane/motherboard might use a particular reserved pin for SmartSwitching, while another vendor might use a different pin or not have the capability at all. In other words, the jumper 112 or other selection means provides flexibility for a card to be used with or without the special function, and/or to select which pin is used to provide the special function, ensuring a wider market for the card.

Examples of the board functions 1–N which could be switched according to the invention include, but are not limited to: opening a tailstock release, i.e., a relay controlled locking mechanism, when a card fails and is powered down for maintenance; lighting an LED (light emitting diode) when a card fails to provide a visual indication to maintenance personnel; providing a synchronized clock signal between the adapter card and a backplane; providing a thermal sense trigger on a microprocessor; providing an analog to digital converter (ADC) input or a digital to analog output (DAC); etc. Virtually any special customized board function desired could be switched with the SmartSwitch I 101.

Figure 1A:
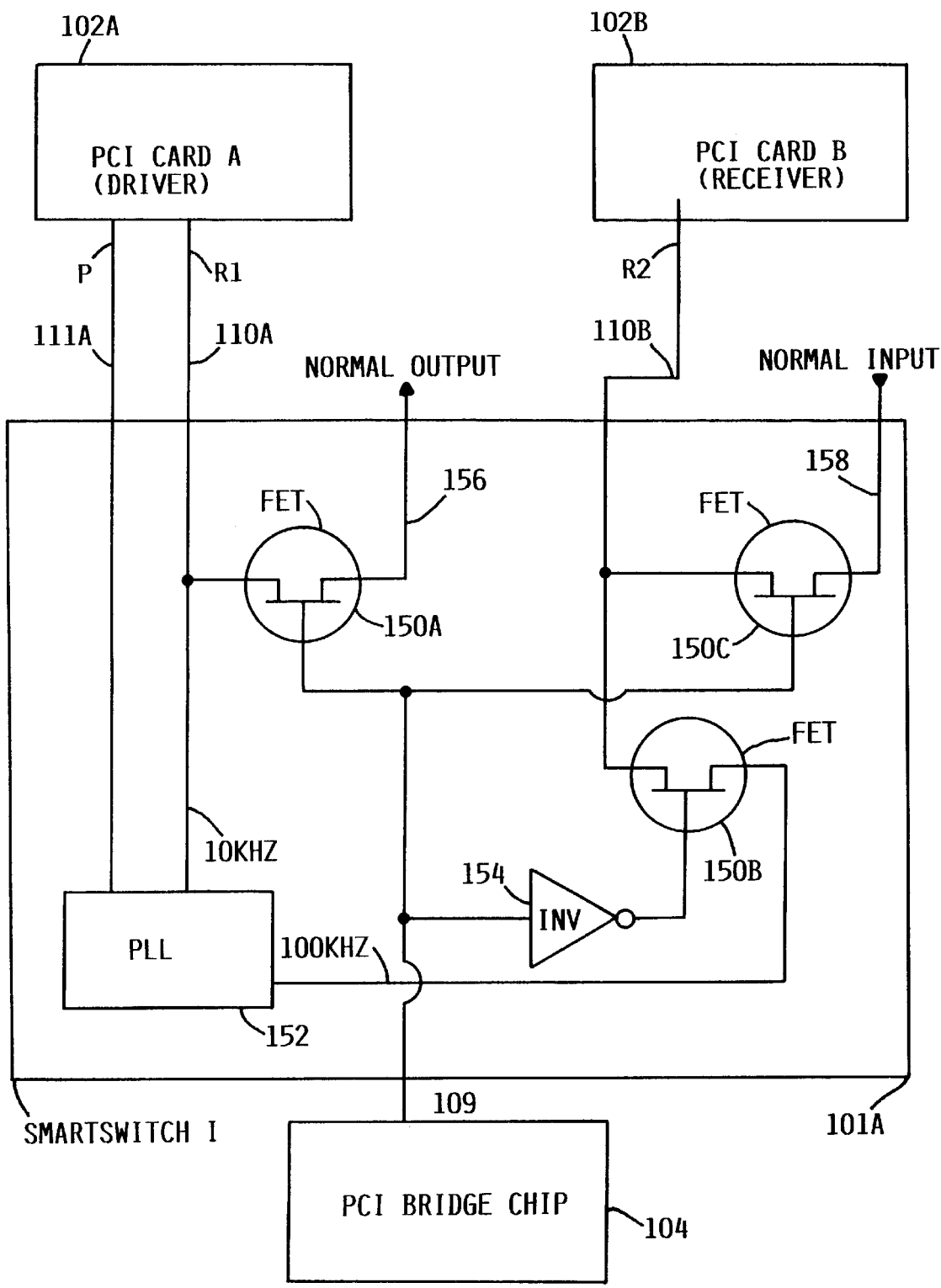
FIG. 1A illustrates an implementation of a SmartSwitch connected in a two card architecture according to an exemplary embodiment of the present invention.

As an example, a single SmartSwitch I could be coupled to two or more PCI cards to synchronize communications therebetween. An implementation of this is illustrated in FIG. 1A. The SmartSwitch I 101A in this case includes a phase-locked-loop (PLL) 152 coupled to the PCI (driver) card A 102A by PRSNT pin (P) 111A and a reserved pin (R1) 110A. Switching is performed by the three low-resistance (e.g., less than 1 ohm in ON state) FET's 150A, 150B and 150C under control of the operating system through the PCI bridge chip 104, as will be explained. If a unique tandem card pair is detected by the operating system, the operating system will disable the normal input and output by controlling the SmartSwitch I 101A. In particular, FET 150C is switched off to disable the normal input 158 on line input R2 110B of PCI card 102B, and FET 150A is switched off to disable the normal output 156 from line R1 110A of PCI driver card A 102A. When the normal input 158 and normal output 156 are deselected, the 10 KHZ frequency signal passed to the PLL 152 is synchronized with the 100 KHZ output to (receiver) card B 102B, selected due to inverter 154 and FET 150B. In this way, card A 102A can communicate with card B 102B synchronized through the PLL 152. Further, if card A 102A were removed, by virtue of the PRSNT pin (P) 111A connection to the PLL 152, the PLL 152 could shift its output to 1 MHZ, for example, signaling to card B 102B that card A 102A has been removed, as opposed to malfunctioning, for example.

Where FET's are used as switching devices, it should be apparent that a very low on resistance is desirable, e.g., less than 1 ohm, so that the SmartSwitch does not have an adverse effect on the signal line.

Figure 2:
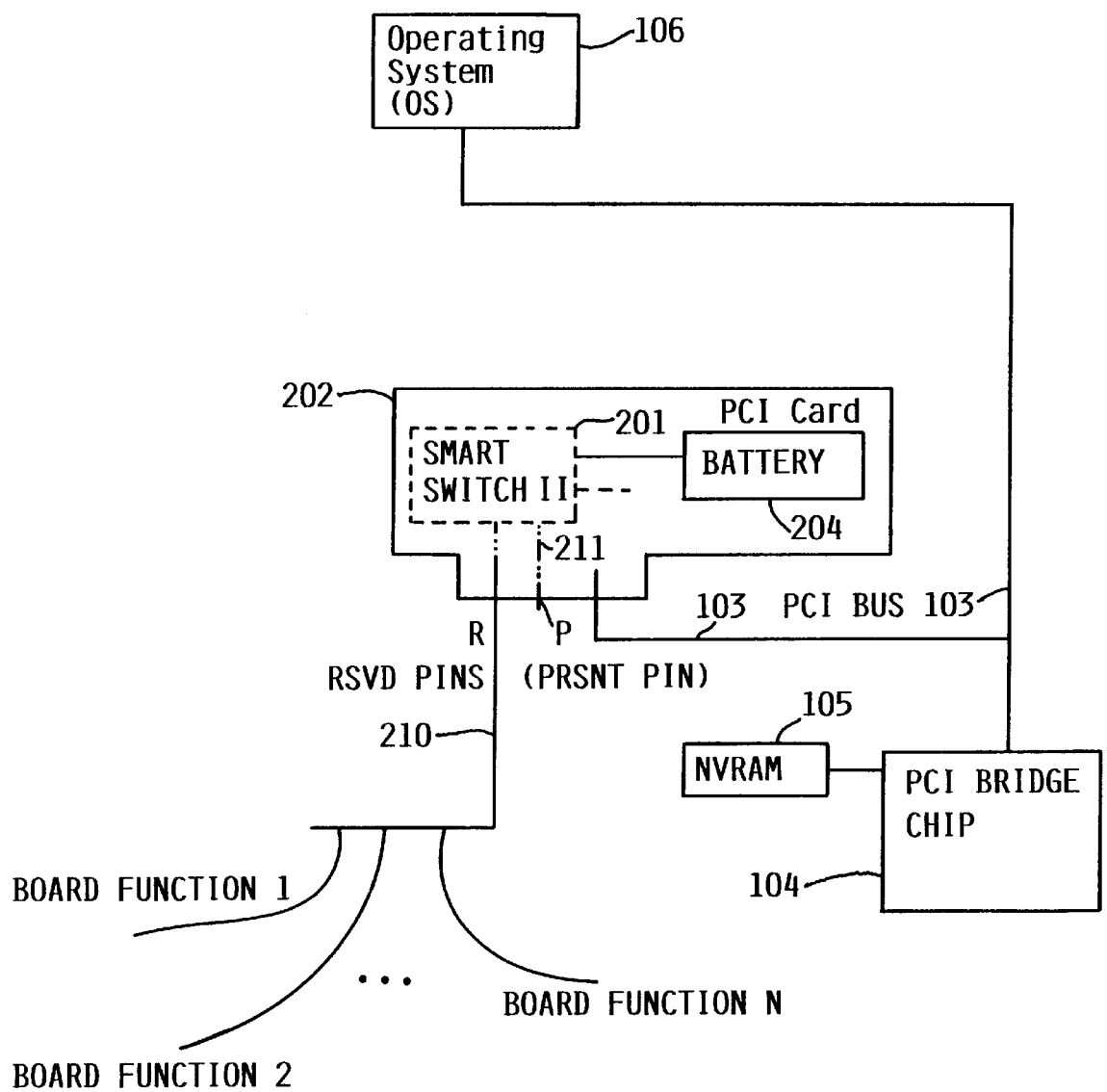
FIG. 2 illustrates a SmartSwitch architecture according to another exemplary embodiment of the invention.

A second embodiment of the invention, illustrated in FIG. 2, conceptually eliminates the SmartSwitch I 101 of the FIG. 1 embodiment, which is there disposed on a backplane/motherboard, and moves the control input (A) to the PCI Card 202 itself. This second exemplary embodiment with the SmartSwitch function on the card itself, is sometimes referred to as the SmartSwitch II embodiment. Again, in a similar fashion to the first embodiment (FIG. 1), the PCI Card 202 would power up with the SmartSwitch II 201 open-circuiting the RSVD pin and/or non-critical pin 210. After the OS 106 has determined its type, it reads the card and backplane/motherboard VPD from the NVRAM 105, and the OS 106 can then instruct the PCI Card 202 to "throw-the-switch" to connect the particular RSVD pin function.

In this case, the PCI Card 202 has circuitry (not shown) for driving the SmartSwitch II 201 through the PCI Bus. This could be accomplished in any number of ways, including putting the PCI Bridge Chip 104 on the PCI Card 202, or by adding other PCI Card logic to respond to a specific PCI configuration cycle or Write command, for example.

The PRSNT pin 211 can be wired as an input to either of the above-described exemplary embodiments, i.e., to SmartSwitch I or SmartSwitch II. This is useful if the output state of the SmartSwitch I or II should change based on whether the PCI Card 102 or 202 is present. As was discussed, an example using SmartSwitch I is illustrated in FIG. 1A.

Another example would be if the SmartSwitch output state should be retained (using a battery or AC trickle charger), negated, or changed, based on the presence of the PCI card. In such a case, the SmartSwitch includes a standby power connection which retains a particular state during a main power source powered down condition. The PRSNT (presence detect) pin indicates the presence of the PCI card at the interface, and a state of the switched output is maintained after the main power source is powered down, for example. If the PRSNT pin indicates the PCI card is no longer present at the PCI interface, in the SmartSwitch I embodiment, besides disabling the standby power to the pins affected, the switched output state of the SmartSwitch 101 might be maintained, negated or otherwise changed depending on the particular implementation as appropriate.

In the case of the SmartSwitch II embodiment of FIG. 2, the PRSNT pin 211 would be an input to SmartSwitch II 201, and be grounded by the backplane/motherboard when the PCI Card 202 is plugged-in to the PCI interface connector, for example. As in the illustration of FIG. 2, the PCI card 202 may be provided with a battery 204 for providing back-up power to the SmartSwitch II 201. In such a case, so long as the PRSNT pin is grounded by the motherboard/backplane, indicating the PCI card 202 is plugged-in, the last output state of the SmartSwitch II would be maintained or switched to an initial state, for example, using the on-board battery back-up power.

Figure 3A:
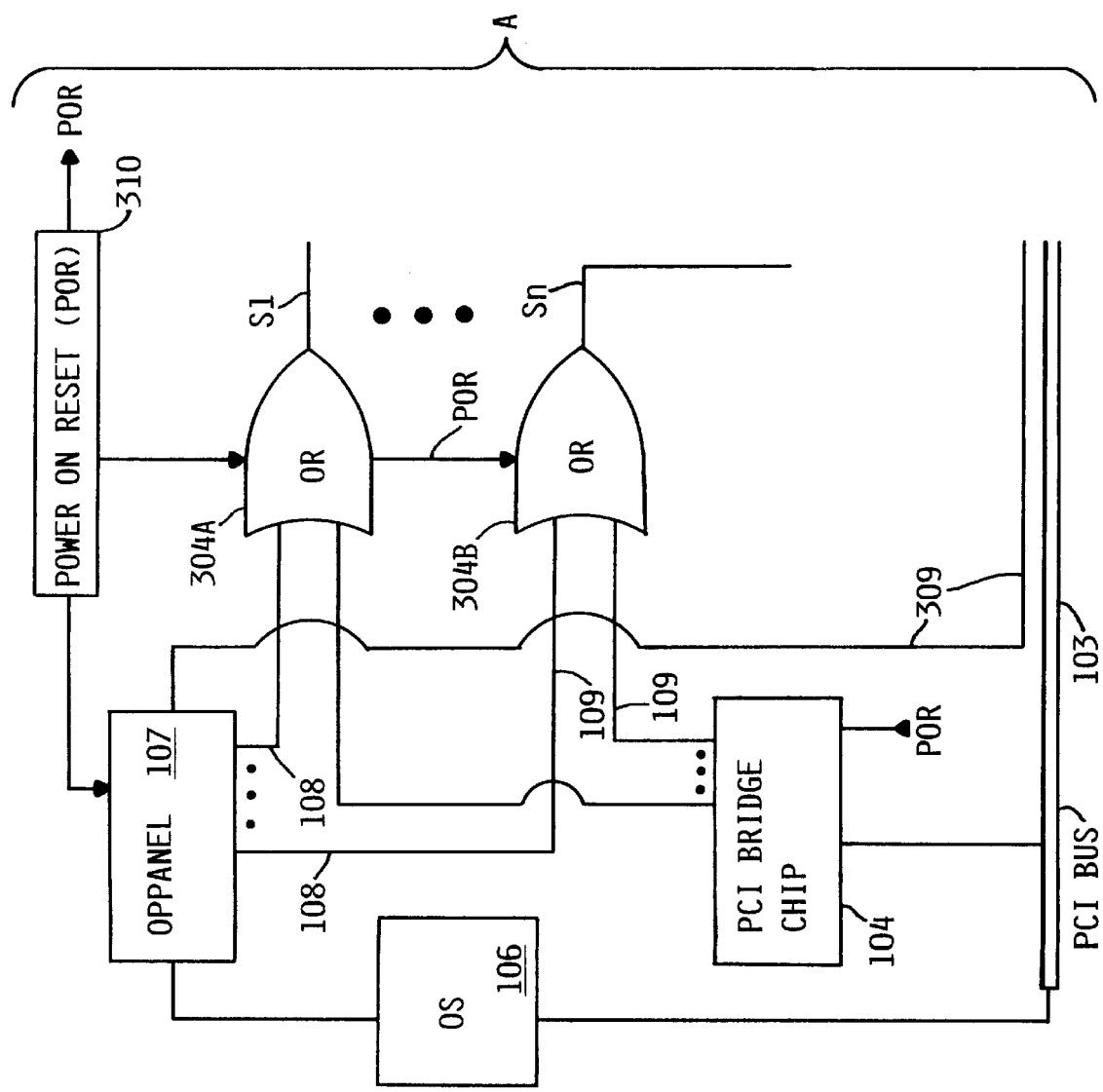
FIG. 3 illustrates an implementation of the embodiment of FIG. 1 in diagrammatic form.
Figure 3B:
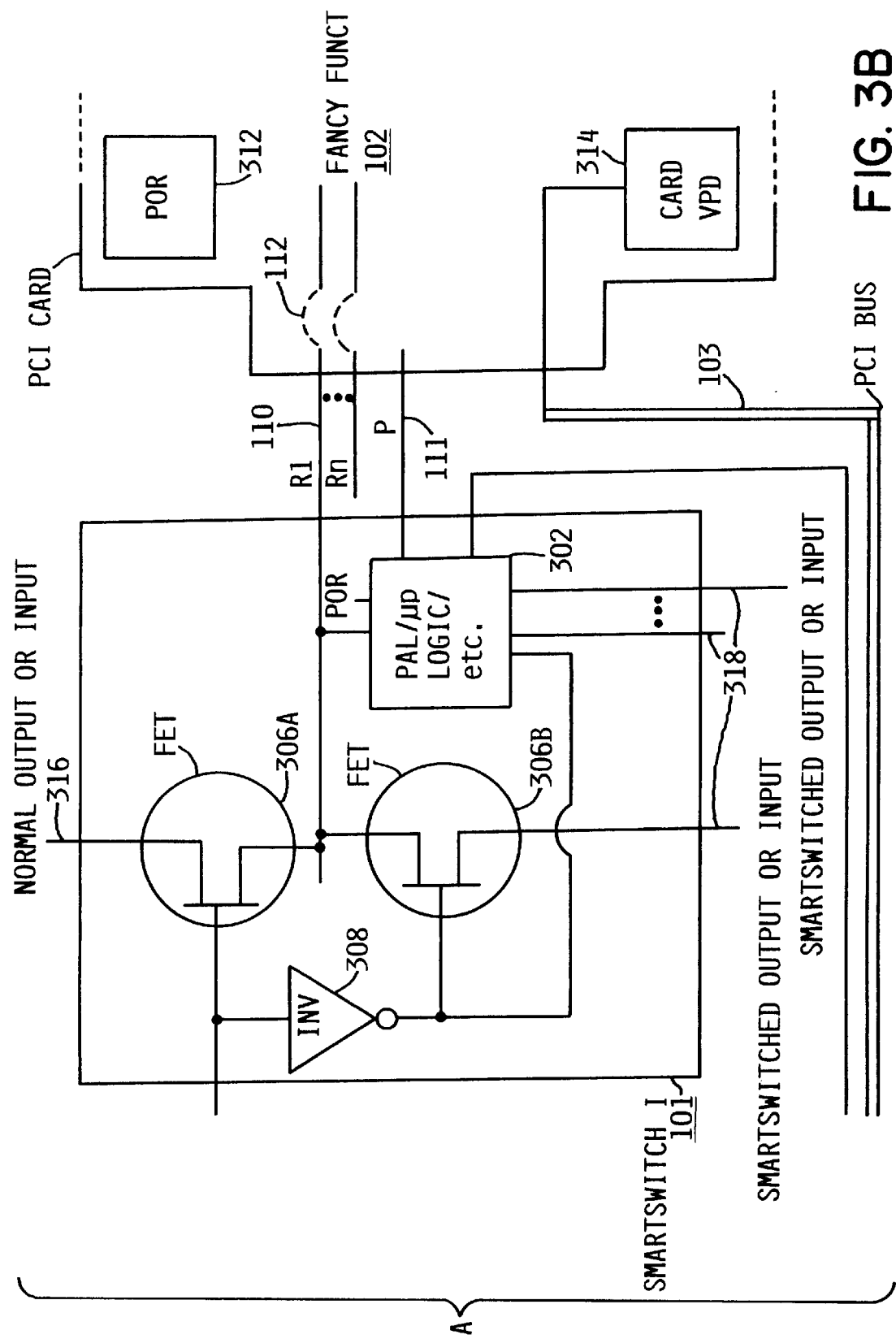

Referring next to FIG. 3, a generalized example of a SmartSwitch I implementation is shown. The particular circuit details shown are only by way of example and the invention is not limited to these particulars. As illustrated, within the exemplary SmartSwitch I 101 is a logic block 302 which could be analog circuits, a programmed array of logic (PAL), a microprocessor, discrete logic devices, a state machine, etc., as would be apparent to one skilled in the art. The PRSNT line (P) 111 is coupled to the logic block 302 for detection of the presence of a PCI card 102. The logic block 302 is also connected to one or more signal lines R1–Rn 110. Jumpers 112, as described with respect to FIG. 1, are shown on the PCI card 101 for selecting which signal line is used, etc. An OR function, represented by OR gates 304A and 304B, is provided either on-board the switch or through software, for example, to receive control signals from either the OpPanel 107, or the PCI bridge chip 104, for example, and cause switching. Alternatively, or in addition, the OpPanel may be connected to the logic block 302 by a serial line 309 to provide switching control.

The switching signal S1 from an OR gate 304A is used to control the selection of either normal input/output 316 or smartswitched input/output 318, by controlling FETs 306A and 306B, as shown. Due to inverter 308, when one FET is turned ON by the signal S1, the other is turned OFF. The inverted signal S1 is provided to the logic block 302 which could alternatively provide the smartswitched input/output 318. Alternatively, the control signal could come directly from the OpPanel 107 on line 309 causing the logic block 302 to switch lines 316, 318. Other control connections could also be implemented, such as by providing a connection directly from the PCI Bridge Chip 104 to the logic block 302, as would be apparent to those skilled in the art. Rather than being a production schematic, the FIG. 3 implementation is representative of the functions implemented in the SmartSwitch I embodiment.

A system power on reset (POR) block 310 is illustrated in FIG. 3. As is known in the art, a POR circuit detects the power supply voltage level and at power on, resets devices to an initial condition. The initial condition of the Smart-Switch I 101 would be, for example, normal input/output 316 enabled. The PCI card could have its own on-board POR circuitry 312 as well.

The operating system (OS) 106 reads card VPD 314 through the PCI bus 103, and then, if appropriate based on the other VPD collected, for example, controls the Smart-Switch I 101 to select smartswitched input/output 318 instead of normal input/output 316. Of course it should be appreciated that one interface pin, e.g., R1 110, could be switched among one or more "fancy" functions with the SmartSwitch I embodiment. Further, the SmartSwitch could provide multiple outputs for one input, one output for multiple inputs, or any combination thereof.

Figure 4:
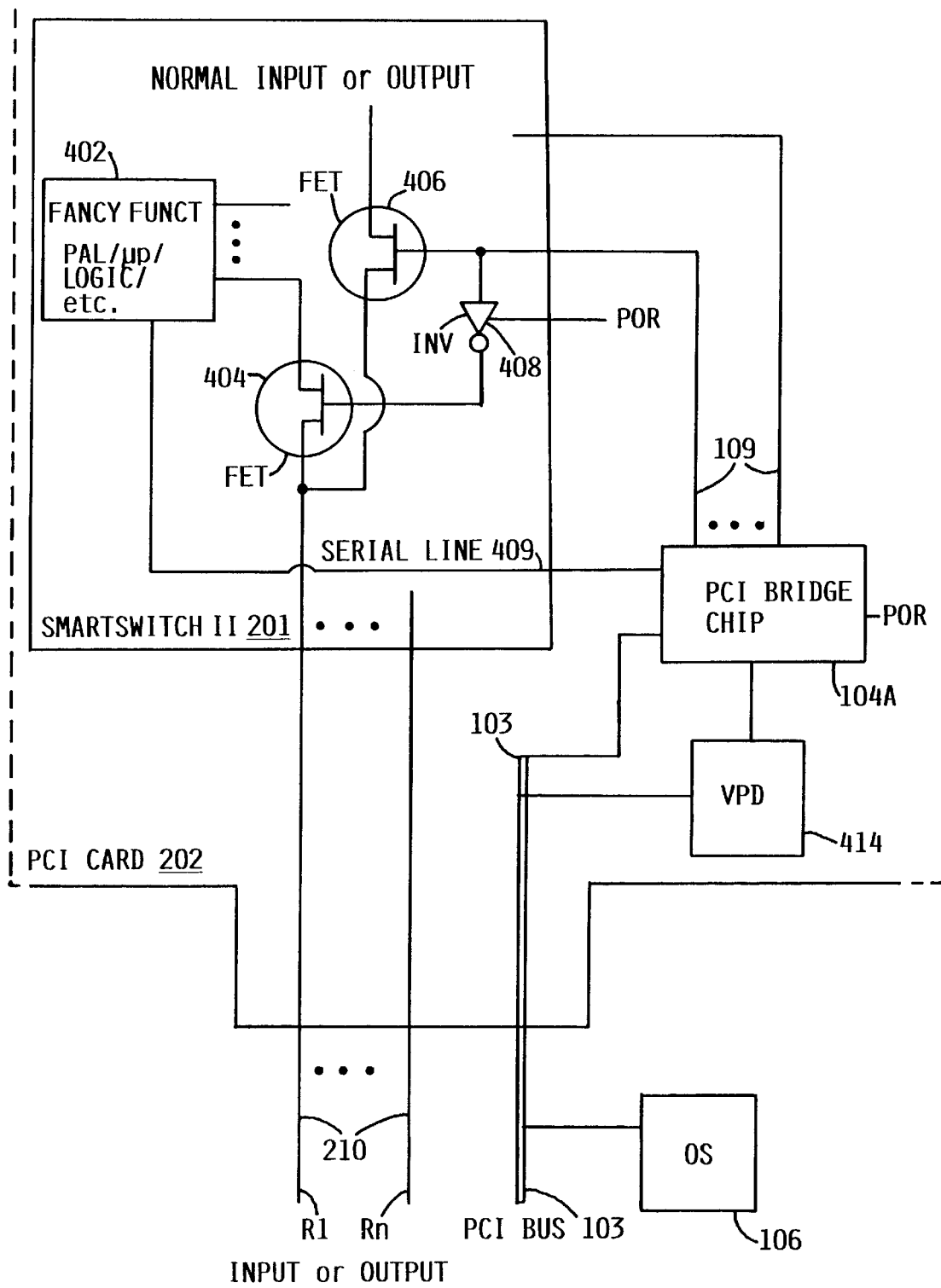
FIG. 4. illustrates an implementation of the embodiment of FIG. 2 in diagrammatic form.

FIG. 4 illustrates a generalized implementation of a SmartSwitch II 201 similar to that shown in FIG. 2, except where a PCI bridge chip 104A is located on the PCI card 202. As described before, the operating system (OS) 106 would detect a special PCI card 202 by reading the card VPD 414 through the PCI bus 103 or the PCU Bridge Chip 104A, for example. Then the operating system 106 would control the SmartSwitch II 201 appropriately to select the "fancy function," through the PCI bridge chip 104A disposed on-board the card 202.

As can be seen, line 109 from the PCI bridge chip 104A controls FET's 404 and 406 to select normal or "fancy" input/output. Inverter 408 ensures that when one FET is On the other is OFF. Alternatively, the PCI Bridge Chip 104A could be directly connected to logic block 402 to select the switched state by a serial line 409, for example.

As in the generalized form of SmartSwitch I shown in FIG. 3, the logic block 402 would implement the fancy function, and could be analog circuitry, a PAL, a microprocessor, discrete digital logic, or the like, for example. The present pin (P) 211 and battery 204 of FIG. 2 have been left out of FIG. 4 for simplicity.

In any implementation of smartswitching, the operating system must know what hardware devices are present in the system, and as mentioned, this can be done through reading vital product data (VPD). In particular, for SmartSwitch purposes, the operating system would typically read the VPD for the PC1 card and for the backplane/motherboard to which the card is attached. VPD about the enclosure in which the backplane/motherboard is disposed might also be read to determine whether the smartswitched or normal input/output is appropriate. Based on this, and the operating system's own VPD, the decision on how to smartswitch is made.

In the FIG. 2 implementation, the NVRAM 105 would contain the VPD for the backplane and could also contain card VPD downloaded from the PCI card 202 and/or the operating system 106 at initialization of the system, for example. The enclosure VPD could be stored in this NVRAM as well.

It should be apparent that a combination of SmartSwitch I and II could be implemented in which the SmartSwitch II on the PCI card is used instead of the jumper for pin selection/enabling, for example. Of course, when using SmartSwitch I and II together, care should be taken not to drive the same pin with opposing signals, and this could be accomplished by starting with the "normal" input/output as the default until the operating system has determined, e.g., through VPD reading, what is appropriate.

The solution according to the present invention would be advantageous for any computer manufacturer because of the ability to differentiate their products from each other, while at the same time not sacrificing their "sweet-spot" volume base using standard PCI cards. Adopting an architecture according to the present invention provides an alternative to current and proposed PCI platforms like COMPACT PCI.

The solution according to the present invention has been described above as implemented using SmartSwitches connected to PCI Bridge chips or serial bus interfaces, for example, on backplanes, and alternatively, implemented by placing the SmartSwitches on the PCI cards themselves.

Advantageously, the solution according to the invention disclosed herein allows any manufacturer/vendor of PCI adapter cards and/or motherboards/back-planes, to provide additional PCI adapter function using PCI Reserved Pins, or other non-critical PCI signal pins. One embodiment of the invention (FIG. 1) allows legacy PCI adapters with the above stated compatibility problems, to migrate to future boxes.

It will be apparent to one skilled in the art that the manner of making and using the claimed invention has been adequately disclosed in the above-written description of the preferred embodiments taken together with the drawings.

It will be understood that the above described preferred embodiments of the present invention are susceptible to various modifications, changes, and adaptations, and the same are intended to be comprehended within the meaning and range of equivalents of the appended claims.

For example, although the embodiments disclosed above involve putting so-called "intelligent switches," also referred to herein as "SmartSwitches," on either a card or a backplane, other implementations of the invention are possible, as would be apparent to one skilled in the art.

Although the invention has been described in a PCI Bus backplane/adapter card environment, it should be apparent that the invention is not limited thereto, but would be applicable to other situations using practically any other bus standards, within the spirit and scope of the invention.

The implementations described utilized switching control by the operating system, and for system integrity and reliability considerations, this may be the preferred implementation. However, an automatic detect/decide feature could be implemented within the spirit of the invention such that the decision on whether to smartswitch is made automatically by logic on-board the backplane andlor card upon powering up, freeing the operating system from this task.

What is claimed is:

1. In an electrical interface providing a predefined number of connections some of which have a predefined function and at least one of which is reserved, undefined or has a non-critical function, an apparatus comprising:
    at least one controllable switch, coupled to switch the at least one connection being reserved, undefined or having a non-critical function to a customized function;
    whereby the electrical interface can be selectively switched to provide a customized functionality using the at least one reserved, undefined or non-critical function connection of the interface
    wherein the electrical interface comprises a connector on a first circuit board and a corresponding connector on a second circuit board, and wherein the at least one controllable switch is disposed on the first circuit board;
    wherein the at least one controllable switch comprises at least one control input for receiving a control signal for controlling switching of the at least one controllable switch;
    wherein the first circuit board includes a bus bridge circuit controlled by an operating system, and wherein the at least one control input comprises a connection to the bus bridge circuit to enable control by a computer operating system.

2. The apparatus according to claim 1, wherein the electrical interface comprises a peripheral component interconnect bus interface.

3. The apparatus according to claim 2, wherein the at least one reserved, undefined or non-critical function connection comprises a peripheral component interconnect reserved pin.

4. The apparatus according to claim 2, wherein the at least one reserved, undefined or non-critical function connection comprises a pin from one of the following group of peripheral component interconnect pins:
    ground pins;
    power management enable (PME) pins;
    3.3 volts auxiliary (3.3VAUX) pins;
    the INTB pin;
    the INTC pin;
    the INTD pin; and
    at least one of a plurality of joint test action group pins, which include the TDO pin, the TDI pin, the TMS pin, and the TCK pin.

5. The apparatus according to claim 1, wherein the at least one control input comprises a signal line to an operating system, separate from the electrical interface.

6. The apparatus according to claim 5, wherein the signal line is a serial signal line controlled by the operating system.

7. The apparatus according to claim 6, wherein the electrical interface comprises a peripheral component interconnect bus interface.

8. The apparatus according to claim 7, wherein the at least one reserved, undefined or non-critical function connection comprises a peripheral component interconnect reserved pin.

9. The apparatus according to claim 7, wherein the at least one reserved, undefined or non-critical function connection comprises a pin from one of the following group of peripheral component interconnect pins:
    ground pins;
    power management enable (PME) pins;
    3.3 volts auxiliary (3.3VAUX) pins;
    the INTB pin;
    the INTC pin;
    the INTD pin; and
    at least one of a plurality of joint test action group pins, which include the TDO pin, the TDI pin, the TMS pin, and the TCK pin.

10. The apparatus according to claim 1, wherein the electrical interface comprises a peripheral component interconnect connector on a first circuit board and a corresponding peripheral component interconnect connector on a second circuit board;
    wherein the first circuit board comprises one of a backplane or motherboard;
    wherein the second circuit board comprises a plug-in circuit card, the plug-in circuit card providing product data through the electrical interface to an operating system indicative of any customized function capabilities of the plug-in circuit card; and
    wherein the at least one controllable switch is disposed on the first circuit board backplane or motherboard.

11. The apparatus according to claim 10, wherein selector means is provided on the second circuit board for enabling/selecting on the second circuit board the at least one reserved, undefined or non-critical function connection coupled to the at least one controllable switch.

12. The apparatus according to claim 11, wherein the selector means comprises a jumper block.

13. The apparatus according to claim 11, wherein the selector means comprises another controllable switch.

14. The apparatus according to claim 1, wherein the electrical interface comprises a peripheral component interconnect connector on a first circuit board and a corresponding peripheral component interconnect connector on a second circuit board;
    wherein the first circuit board comprises one of a backplane or motherboard;
    wherein the second circuit board comprises a plug-in circuit card, the plug-in circuit card providing product data through the electrical interface to an operating system indicative of any customized function capabilities of the plug-in circuit card; and
    wherein the at least one controllable switch is disposed on the plug-in circuit card.

15. In an electrical interface providing a predefined number of connections some of which have a predefined function and at least one of which is reserved, undefined or has a non-critical function, an apparatus comprising:

at least one controllable switch, coupled to switch the at least one connection being reserved, undefined or having a non-critical function to a customized function;

whereby the electrical interface can be selectively switched to provide a customized functionality using the at least one reserved, undefined or non-critical function connection of the interface;

wherein the electrical interface comprises a connector on a first circuit board and a corresponding connector on a second circuit board, and wherein the at least one controllable switch is disposed on the second circuit board;

wherein the at least one controllable switch comprises at least one control input for receiving a control signal for controlling the switching; and wherein the second circuit board includes a bus bridge circuit which receives signals through the electrical interface from an operating system, and wherein the at least one control input comprises a signal line from the bus bridge circuit.

16. The apparatus according to claim 15, wherein the at least one control input for receiving a control signal for controlling the switching comprises a connection of the electrical interface connectors.

17. The apparatus according to claim 16, wherein the electrical interface comprises a peripheral component interconnect bus interface.

18. The apparatus according to claim 17, wherein the at least one reserved, undefined or non-critical function connection comprises a peripheral component interconnect reserved pin.

19. The apparatus according to claim 17, wherein the at least one reserved, undefined or non-critical function connection comprises a pin from one of the following group of peripheral component interconnect pins:

ground pins;

power management enable (PME) pins;

3.3 volts auxiliary (3.3VAUX) pins;

the INTB pin;

the INTC pin;

the INTD pin; and at least one of a plurality of joint test action group pins, which include the TDO pin, the TDI pin, the TMS pin, and the TCK pin.

20. The apparatus according to claim 13 wherein bus bridge circuit enables control of the at least one controllable switch by the computer operating system.

21. The apparatus according to claim 20, wherein the electrical interface comprises a peripheral component interconnect bus interface.

22. The apparatus according to claim 21, wherein the at least one reserved, undefined or non-critical function connection comprises a peripheral component interconnect reserved pin.

23. The apparatus according to claim 21, wherein the at least one reserved, undefined or non-critical function connection comprises a pin from one of the following group of peripheral component interconnect pins:

ground pins;

power management enable (PME) pins;

3.3 volts auxiliary (3.3VAUX) pins;

the INTB pin;

the INTC pin;

the INTD pin; and at least one of a plurality of joint test action group pins, which include the TDO pin, the TDI pin, the TMS pin, and the TCK pin.

24. The apparatus according to claim 1, wherein the electrical interface comprises a peripheral component interconnect connector on a first circuit board and a corresponding peripheral component interconnect connector on a second circuit board;

wherein the first circuit board comprises one of a backplane or motherboard;

wherein the second circuit board comprises a plug-in circuit card;

wherein the at least one controllable switch is disposed on the first circuit board; and wherein selector means is provided on the second circuit board for enabling/selecting on the second circuit board the at least one reserved, undefined or non-critical function connection coupled to the at least one controllable switch.

25. The apparatus according to claim 1, wherein the electrical interface comprises a peripheral component interconnect connector on a first circuit board and a corresponding peripheral component interconnect connector on a second circuit board;

wherein the first circuit board comprises one of a backplane or motherboard;

wherein the second circuit board comprises a plug-in circuit card; and wherein the at least one controllable switch is disposed on the second circuit board.

26. A method of selectively switching reserved, undefined or non-critical function connections of an electrical interface to provide additional functionality comprising utilizing the apparatus according to claim 1.

27. A method of providing at least one customized function to an electrical interface having a predefined number of connections at least some of which have predefined functions and at least one of which is reserved, undefined or has a non-critical function, the method comprising:

switching the at least one reserved, undefined or non-critical function connection to a customized function;

wherein the first circuit board includes a bus bridge circuit, and wherein the controlling comprises sending a control signal to the switch circuit from the bus bridge circuit through the electrical interface.

28. The method according to claim 27, wherein the electrical interface includes a connector on a first circuit board and a corresponding connector on a second circuit board, and wherein the switching comprises controlling a switch circuit on the first circuit board.

29. The method according to claim 28, wherein the controlling comprises sending a control signal to the switch circuit through a connection of the electrical interface.

30. The method according to claim 29, wherein the electrical interface comprises a peripheral component interconnect bus interface, and wherein the switching comprises switching a peripheral component interconnect reserved pin to a customized function.

31. The method according to claim 29, wherein the electrical interface comprises a peripheral component interconnect bus interface, and wherein the switching comprises switching a non-critical peripheral component interconnect pin to a customized function, the non-critical peripheral component interconnect pin comprising a pin selected from one of the following group of peripheral component interconnect pins:

ground pins;
power management enable (PME) pins;
3.3 volts auxiliary (3.3VAUX) pins;
the INTB pin;
the INTC pin;
the INTD pin; and
at least one of a plurality of joint test action group pins, which include the TDO pin, the TDI pin, the TMS pin, and the TCK pin.

32. The method according to claim 28, wherein the controlling comprises sending a control signal to the switch circuit through a signal line separate from the electrical interface.

33. The method according to claim 32, wherein the sending comprises sending the control signal on a serial signal line controlled by an operating system.

34. The method according to claim 33, wherein the electrical interface comprises a peripheral component interconnect bus interface, and wherein the switching comprises switching a peripheral component interconnect reserved pin to a customized function.

35. The method according to claim 33, wherein the electrical interface comprises a peripheral component interconnect bus interface, and wherein the switching comprises switching a non-critical peripheral component interconnect pin to a customized function, the non-critical peripheral component interconnect pin comprising a pin selected from one of the following group of peripheral component interconnect pins:
ground pins;
power management enable (PME) pins;
3.3 volts auxiliary (3.3VAUX) pins;
the INTB pin;
the INTC pin;
the INTD pin; and
at least one of a plurality of joint test action group pins, which include the TDO pin, the TDI pin, the TMS pin, and the TCK pin.

36. The method according to claim 27, wherein the electrical interface includes a connector on a first circuit board and a corresponding connector on a second circuit board, and wherein the switching comprises controlling a switch circuit on the second circuit board.

37. The method according to claim 36, wherein the controlling comprises sending a control signal to the switch circuit through a connection of the electrical interface.

38. The method according to claim 37, wherein the electrical interface comprises a peripheral component interconnect bus interface, and wherein the switching comprises switching a peripheral component interconnect reserved pin to a customized function.

39. The method according to claim 37, wherein the electrical interface comprises a peripheral component interconnect bus interface, and wherein the switching comprises switching a non-critical peripheral component interconnect pin to a customized function, the non-critical peripheral component interconnect pin comprising a pin selected from one of the following group of peripheral component interconnect pins:
ground pins;
power management enable (PME) pins;
3.3 volts auxiliary (3.3VAUX) pins;
the INTB pin;
the INTC pin;
the INTD pin; and
at least one of a plurality of joint test action group pins, which include the TDO pin, the TDI pin, the TMS pin, and the TCK pin.

40. The method according to claim 27, wherein the bus bridge circuit is coupled to receive signals from an operating system, and wherein the controlling further comprises receiving a signal from an operating system with the bus bridge circuit.

41. The method according to claim 40, wherein the electrical interface comprises a peripheral component interconnect bus interface, and wherein the switching comprises switching a peripheral component interconnect reserved pin to a customized function.

42. The method according to claim 40, wherein the electrical interface comprises a peripheral component interconnect bus interface, and wherein the switching comprises switching a non-critical peripheral component interconnect pin to a customized function, the non-critical peripheral component interconnect pin comprising a pin selected from one of the following group of peripheral component interconnect pins:
ground pins;
power management enable (PME) pins;
3.3 volts auxiliary (3.3VAUX) pins;
the INTB pin;
the INTC pin;
the INTD pin; and
at least one of a plurality of joint test action group pins, which include the TDO pin, the TDI pin, the TMS pin, and the TCK pin.

43. The method according to claim 40, wherein the second circuit board includes a bus bridge circuit, and wherein the controlling comprises sending a control signal from the bus bridge circuit to the switch circuit through the electrical interface.

44. The method according to claim 27, wherein the electrical interface is disposed in an electrical system having a main power source, and the electrical interface includes a connector on a first circuit board and a corresponding connector on a second circuit board, and wherein the switching comprises controlling a switch circuit, the method further comprising:
retaining a state of the switch circuit after the main power source is powered down.

45. The method according to claim 44, wherein the switch circuit includes a standby power connection which maintains a particular state during a main power source powered down condition, wherein the electrical interface includes a presence detect pin which indicates the presence of the second circuit board at the interface, and wherein the method further comprises enabling standby power operation based on a state of the presence detect pin.

46. The method according to claim 27, wherein the electrical interface includes a connector on a first circuit board and a corresponding connector on a second circuit board, wherein the first circuit board comprises one of a backplane or motherboard, wherein the second circuit board comprises a plug-in circuit card, and wherein the method further comprises:
providing product data from the plug-in circuit card through the electrical interface to an operating system indicative of any customized function capabilities of the plug-in circuit card; and
wherein the switching comprises controlling a switch circuit on the first circuit board.

47. The method according to claim 27, wherein the electrical interface includes a connector on a first circuit board and a corresponding connector on a second circuit board, wherein the first circuit board comprises one of a backplane or motherboard, wherein the second circuit board comprises a plug-in circuit card, and wherein the method further comprises:

provide product data from the plug-in circuit card through the electrical interface to an operating system indicative of any customized function capabilities of the plug-in circuit card; and wherein the switching comprises controlling a switch circuit on the plug-in circuit card.

48. In a computer system, an arrangement comprising:

an operating system;

an operator panel coupled to the operating system;

a computer system bus coupled to the operating system;

a backplane having a bus connector thereon with a plurality of pins, at least one of which is reserved, undefined or has a non-critical function;

a controllable switch disposed on the backplane, coupled to be controlled by the operating system, and coupled to switch the at least one reserved, undefined or non-critical function pin of the plurality of pins of the bus connector to a customized function when a circuit card having the customized function is plugged-in to the bus connector;

wherein the backplane has a bus bridge circuit disposed thereon coupled to the computer system bus and to the controllable switch, and wherein the controllable switch is controlled by the operating system through the bus bridge circuit.

49. The arrangement according to claim 48, wherein the computer system bus comprises a peripheral component interconnect (PCI) bus, and wherein the at least one reserved, undefined or non-critical function pin is selected from the group of PCI pins including:

ground pins;

reserved pins;

power management enable (PME) pins;

3.3 volts auxiliary (3.3VAUX) pins;

the INTB pin;

the INTC pin;

the INTD pin; and at least one of a plurality of joint test action group pins, which include the TDO pin, the TDI pin, the TMS pin, and the TCK pin.

50. In a computer system, an arrangement comprising:

an operating system;

a computer system bus coupled to the operating system;

a backplane having a bus connector thereon with a plurality of pins, at least one of which is reserved, undefined or has a non-critical function;

a circuit card pluggable in the bus connector having a corresponding bus connector thereon with a plurality of pins, at least one of which is reserved, undefined or has a non-critical function;

a controllable switch disposed on the pluggable card, coupled to be controlled by the operating system through the bus connector, and coupled to switch the at least one reserved, undefined or non-critical function pin of the plurality of pins of the bus connector to a customized function when controlled to do so by the operating system;

wherein the backplane has a bus bridge circuit disposed thereon coupled to the computer system bus, and wherein the controllable switch is controlled by the operating system through the bus bridge circuit.

51. The arrangement according to claim 50, wherein the computer system bus comprises a peripheral component interconnect (PCI) bus, and wherein the at least one reserved, undefined or non-critical function pin is selected from the group of PCI pins including:

ground pins;

reserved pins;

power management enable (PME) pins;

3.3 volts auxiliary (3.3VAUX) pins;

the INTB pin;

the INTC pin;

the INTD pin; and at least one of a plurality of joint test action group pins, which include the TDO pin, the TDI pin, the TMS pin, and the TCK pin.

52. The arrangement according to claim 50, wherein the pluggable card has a bus bridge circuit disposed thereon coupled to the computer system bus, and wherein the controllable switch is controlled by the operating system through the bus bridge circuit.

53. The method according to claim 27, wherein the electrical interface includes a connector on a first circuit board and a corresponding connector on a second circuit board, wherein the first circuit board comprises one of a backplane or motherboard, wherein the backplane or motherboard is disposed in an enclosure of a computer system having an operating system controlling the computer system, wherein the second circuit board comprises a plug-in circuit card, and wherein the method further comprises:

collecting product data from the plug-in circuit card through the electrical interface to the operating system indicative of any customized function capabilities of the plug-in circuit card; and controlling the switching based on the product data about the plug-in circuit card pin.

54. The method according to claim 53, wherein the method further comprises collecting product data about the operating system, the enclosure, and the backplane or motherboard; and wherein the controlling the switching further comprises controlling the switching based on all the product data collected.

* * * * *